US011032781B2

(12) United States Patent
Chang et al.

(10) Patent No.: US 11,032,781 B2
(45) Date of Patent: Jun. 8, 2021

(54) INTER-NODE INTERFERENCE AVOIDANCE

(71) Applicant: Apple Inc., Cupertino, CA (US)

(72) Inventors: Wenting Chang, Beijing (CN);
Huaning Niu, San Jose, CA (US);
Qiaoyang Ye, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/475,667

(22) PCT Filed: Dec. 29, 2017

(86) PCT No.: PCT/US2017/069114
§ 371 (c)(1),
(2) Date: Jul. 2, 2019

(87) PCT Pub. No.: WO2018/128948
PCT Pub. Date: Jul. 12, 2018

(65) Prior Publication Data
US 2020/0288410 A1        Sep. 10, 2020

Related U.S. Application Data

(60) Provisional application No. 62/443,118, filed on Jan. 6, 2017.

(51) Int. Cl.
*H04W 52/38*        (2009.01)
*H04W 52/24*        (2009.01)
*H04W 16/14*        (2009.01)

(52) U.S. Cl.
CPC ......... *H04W 52/243* (2013.01); *H04W 52/38* (2013.01); *H04W 16/14* (2013.01)

(58) Field of Classification Search
CPC .... H04W 52/243; H04W 52/38; H04W 16/14
USPC ......................................................... 455/522
See application file for complete search history.

(56) References Cited

U.S. PATENT DOCUMENTS

| 8,948,085 | B2* | 2/2015 | Barbieri | H04W 72/082 |
| | | | | 370/328 |
| 9,560,674 | B2* | 1/2017 | Djukic | H04L 5/14 |
| 9,585,103 | B2* | 2/2017 | Chen | H04W 52/146 |
| 9,591,596 | B2* | 3/2017 | Seo | H04L 27/2613 |
| 9,774,436 | B2* | 9/2017 | Jeon | H04L 5/0001 |

(Continued)

FOREIGN PATENT DOCUMENTS

WO         2014056137         4/2014

OTHER PUBLICATIONS

International Search Report and Written Opinion for International Patent Application No. PCT/US17/69114, dated Apr. 16, 2018.

(Continued)

*Primary Examiner* — Hai V Nguyen
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry and a second circuitry. The first circuitry may be operable to establish that Downlink (DL) transmissions from a second Evolved Node-B (eNB) will interfere in one or more subframes with Uplink (UL) transmissions from the UE to a first eNB. The second circuitry may be operable to modulate a UL transmission power based upon the established interference condition.

24 Claims, 12 Drawing Sheets

(56) References Cited

U.S. PATENT DOCUMENTS

| | | | | |
|---|---|---|---|---|
| 9,794,051 | B2* | 10/2017 | Feng | H04W 52/146 |
| 9,924,368 | B2* | 3/2018 | Valliappan | H04W 16/14 |
| 9,924,509 | B2* | 3/2018 | Xu | H04L 5/003 |
| 9,986,586 | B2* | 5/2018 | Lee | H04W 74/004 |
| 9,991,998 | B2* | 6/2018 | Peng | H04W 16/14 |
| 10,116,427 | B2* | 10/2018 | Wang | H04W 52/245 |
| 10,219,159 | B2* | 2/2019 | Baek | H04W 16/14 |
| 10,313,075 | B2* | 6/2019 | Yi | H04W 72/042 |
| 10,321,401 | B2* | 6/2019 | Li | H04W 74/0816 |
| 10,349,293 | B2* | 7/2019 | Yerramalli | H04W 72/085 |
| 10,412,753 | B2* | 9/2019 | Yi | H04W 72/1215 |
| 10,524,148 | B2* | 12/2019 | Sadek | H04W 16/14 |
| 10,582,455 | B2* | 3/2020 | Sanderovich | H04B 17/373 |
| 10,645,727 | B2* | 5/2020 | Islam | H04B 7/0617 |
| 2012/0063383 | A1 | 3/2012 | Barbieri | H04W 72/082 370/315 |
| 2014/0355557 | A1* | 12/2014 | Peng | H04L 5/0091 370/330 |
| 2015/0067435 | A1* | 3/2015 | Yerramalli | H04L 1/0034 714/748 |
| 2015/0092703 | A1* | 4/2015 | Xu | H04W 72/0446 370/329 |
| 2015/0163680 | A1* | 6/2015 | Valliappan | H04L 5/0073 370/329 |
| 2015/0215100 | A1* | 7/2015 | Jeon | H04L 5/0053 370/252 |
| 2015/0215874 | A1* | 7/2015 | Chen | H04W 52/16 455/522 |
| 2015/0223244 | A1* | 8/2015 | Tabet | H04W 72/0406 370/329 |
| 2015/0256320 | A1* | 9/2015 | Feng | H04W 74/004 370/280 |
| 2015/0304872 | A1* | 10/2015 | Sadek | H04W 24/10 370/252 |
| 2015/0365152 | A1* | 12/2015 | Frenne | G03G 15/0812 370/252 |
| 2016/0088657 | A1* | 3/2016 | Djukic | H04L 5/14 370/294 |
| 2016/0227571 | A1* | 8/2016 | Baek | H04W 48/20 |
| 2016/0227578 | A1* | 8/2016 | Lee | H04W 74/0816 |
| 2016/0309354 | A1* | 10/2016 | Yerramalli | H04W 76/27 |
| 2017/0048041 | A1* | 2/2017 | Yi | H04L 5/0048 |
| 2017/0086213 | A1* | 3/2017 | Kalhan | H04W 72/0453 |
| 2017/0288962 | A1* | 10/2017 | Yi | H04W 72/0453 |
| 2017/0339641 | A1* | 11/2017 | Nigam | H04L 5/0096 |
| 2018/0013539 | A1* | 1/2018 | Feng | H04W 52/243 |
| 2018/0014304 | A1* | 1/2018 | Khoshnevisan | H04W 24/08 |
| 2018/0049129 | A1* | 2/2018 | Li | H04W 74/0816 |
| 2018/0063794 | A1* | 3/2018 | Sanderovich | H04W 74/0816 |
| 2018/0091283 | A1* | 3/2018 | Wang | H04W 52/325 |
| 2018/0167848 | A1* | 6/2018 | Lei | H04W 72/0453 |
| 2018/0167942 | A1* | 6/2018 | Xu | H04L 5/003 |
| 2018/0184457 | A1* | 6/2018 | Islam | H04W 24/10 |
| 2019/0281482 | A1* | 9/2019 | Yerramalli | H04W 24/08 |
| 2020/0187129 | A1* | 6/2020 | Sanderovich | H04B 17/373 |

OTHER PUBLICATIONS

ZTE Microelectronics, "Discussion on duplex and interference management", 3GPP Draft; R1-1612156; vol. RAN WG1; Reno, Nevada USA; Nov. 13, 2016.

International Preliminary Report on Patentability for PCT Application No. PCT/US17/69114, dated Jul. 18, 2019 10 pgs.

* cited by examiner

INTER-NODE INTERFERENCE AVOIDANCE

CLAIM OF PRIORITY

This Application is a National Stage Entry of, and claims priority to, PCT Application No. PCT/US17/69114, filed on Dec. 29, 2017 and titled "INTER-NODE INTERFERENCE AVOIDANCE", which claims priority under 35 U.S.C. § 119(e) to U.S. Provisional Patent Application Ser. No. 62/443,118 filed Jan. 6, 2017 both of which are herein incorporated by reference in their entireties.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system/5G New Radio (NR) system. Next-generation wireless cellular communication systems may provide support for higher bandwidths in part by using unlicensed spectrum.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1A:
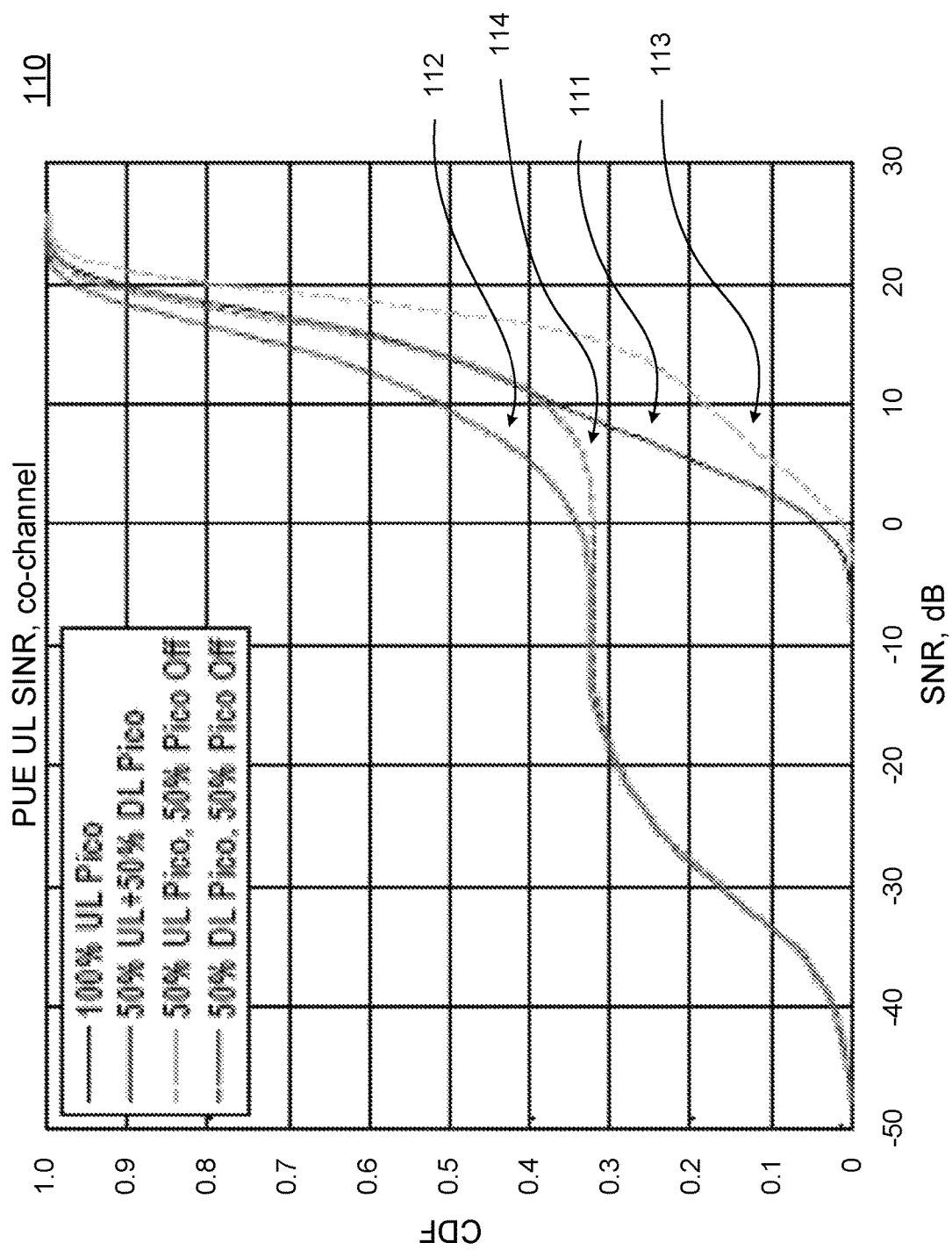
FIGS. 1A-1B illustrate Signal-to-Interference-plus-Noise Ratio (SINR) distributions in an Enhanced Interference Mitigation and Traffic Adaptation (eIMTA) system, in accordance with some embodiments of the disclosure.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and next-generation wireless cellular communication systems, such as a 5th Generation 5G wireless system/5G mobile networks system/5G New Radio (NR) system. Next-generation wireless cellular communication systems may provide support for higher bandwidths in part by using unlicensed spectrum.

LTE-based technology may operate solely in unlicensed spectrum without relying upon an "anchor" in the licensed spectrum, such as in MulteFire™ technology by MulteFire Alliance of Fremont Calif., USA. Standalone LTE operation in unlicensed spectrum may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic. Since MulteFire systems might not require assistance from licensed spectrum to make use of unlicensed spectrum, they may advantageously enable leaner, self-contained network architectures suitable for neutral deployments in unlicensed spectrum.

MulteFire might employ 3.5 Gigahertz (GHz) as a potential unlicensed spectrum for deployment. Future 3GPP releases may also provide for operation of NR or enhanced License-Assisted Access (eLAA) systems on a 3.5 GHz Citizens Broadband Radio Service (CBRS) spectrum.

Use of the 3.5 GHz band was previously restricted by the United States Department of Defense, but has recently been opened up to commercial purposes. The Federal Communications Commission (FCC) has adopted a three-tiered access model for a 3.5 GHz CBRS band, having a first tier for incumbent users (e.g., federal government users and Fixed Satellite Service), a second tier for priority access licensees (PALs) (100 Megahertz (MHz), on auction for short-term licensing), and a third tier for general authorized access (GAA) (150 MHz, open for anyone with an FCC-certified device).

For GAA deployment, both LTE Time-Division Duplex (LTE-TDD) and Multefire and/or eLAA may be considered for CBRS. CBRS might allocate different GAA channels for GAA deployment by Spectrum Allocation Servers (SAS). As an example deployment, four operators might deploy GAA within one census tract, with four GAA channels available. An example of SAS assignment might comprise two channels going toward LTE-TDD and two channels going toward MulteFire and/or LAA. Each LTE-TDD channel might get one 10 Mhz channel, while the two MulteFire and/or LAA channels might use 20 MHz total, and may share the medium with a built-in Listen-Before-Talk (LBT) mechanism.

The FCC has also defined two kinds of Evolved Node-Bs (eNBs). A first kind of eNB, a CAT B CBSD (Citizens Broadband Radio Service Device), may be suitable for professional installation and/or merely outdoor deployment. A second kind of eNB, a CAT A CBSD, may be deployed like WiFi, and may be either indoor or outdoor.

MulteFire may support interference coordination for low power nodes, which may relate to co-existence scenarios similar to those of eIMTA systems, in which different nodes may dynamically choose to transmit Downlink (DL) or Uplink (UL) traffic.

Figure 1B:
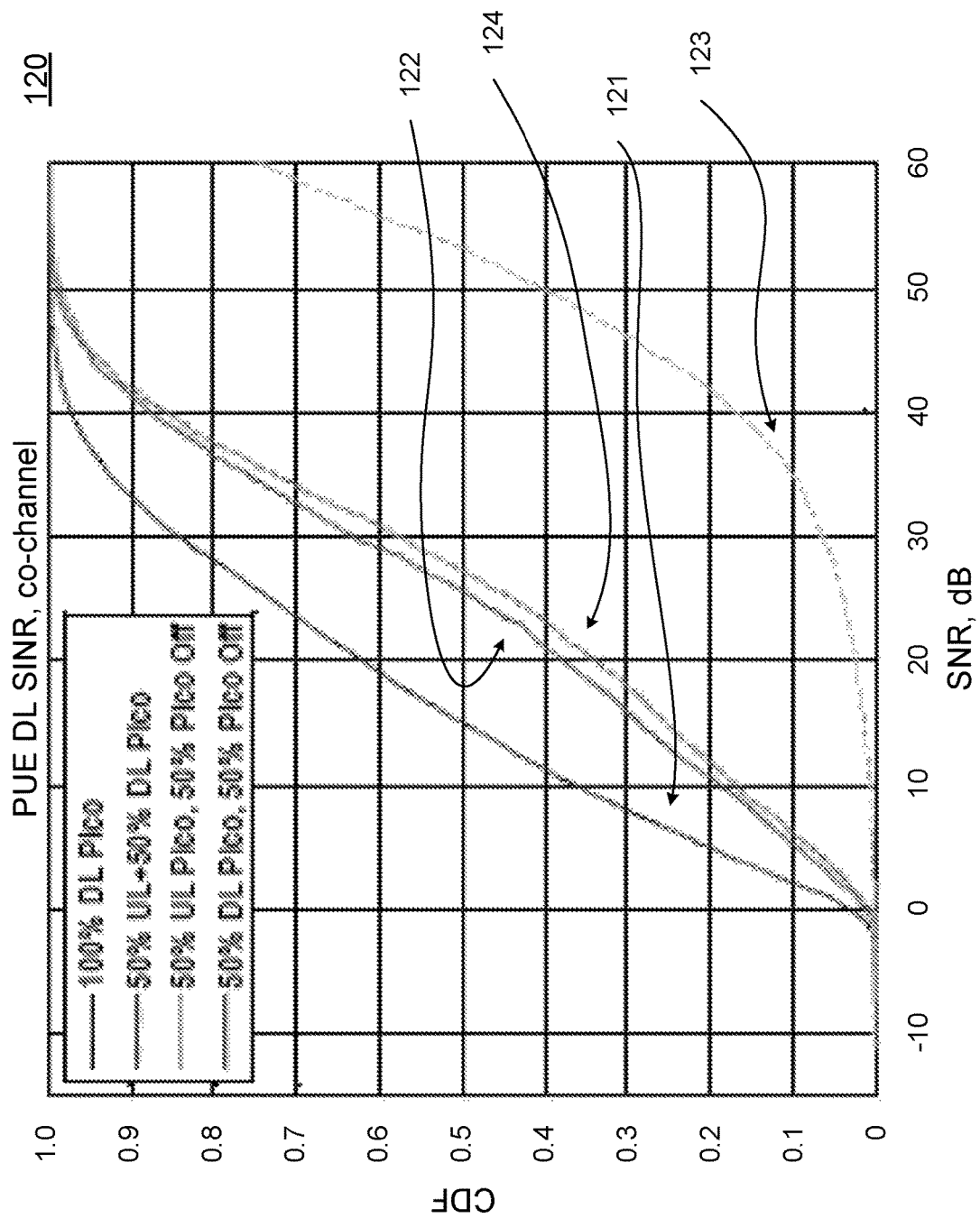

FIGS. 1A-1B illustrate Signal-to-Interference-plus-Noise Ratio (SINR) distributions in an Enhanced Interference Mitigation and Traffic Adaptation (eIMTA) system, in accordance with some embodiments of the disclosure. A first chart 110 (depicted in FIG. 1A) may correspond with PUE (e.g., UE power) UL SINR, and a second chart 120 (depicted in FIG. 1B) may correspond with PUE DL SINR. First chart 110 and second chart 120 may depict geometry SINR in eIMTA systems.

First chart 110 may comprise a first scenario 111, which may correspond with 100% UL traffic; a second scenario 112, which may correspond with 50% UL traffic and 50% DL traffic (e.g., of a picocell eNB); a third scenario 113, which may correspond with 50% UL traffic and 50% off (e.g., of a picocell eNB); and a fourth scenario 114, which may correspond with 50% DL traffic and 50% off (e.g., of a picocell eNB). In comparison with first scenario 111, the SINR of second scenario 112 is decreased, which implies that DL transmissions may cause severe interference to UL transmissions.

Second chart 120 may comprise a first scenario 121, which may correspond with 100% DL traffic (e.g., of a picocell eNB); a second scenario 122, which may correspond with 50% UL traffic and 50% DL traffic (e.g., of a picocell eNB); a third scenario 123, which may correspond with 50% UL traffic and 50% off (e.g., of a picocell eNB); and a fourth scenario 124, which may correspond with 50% DL traffic and 50% off (e.g., of a picocell eNB). In comparison with first scenario 121, the SINR of second scenario 122 may be increased, which also implies that DL transmissions may cause severe interference to UL transmissions.

Such interference may come from neighboring DL transmissions, and may impact serving-cell UL transmissions or serving-cell DL transmissions. Various mechanisms and methods are disclosed herein to advantageously avoid such interference and improve the performance of edge users. Some embodiments may employ UL transmission enhancement (which may be higher-layer configured and/or dynamically configured). Some embodiments may employ reduced-power DL transmission (which may include co-existence of serving DL transmissions or serving UL transmissions with power-reduced interfering DL transmissions).

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

Figure 2:
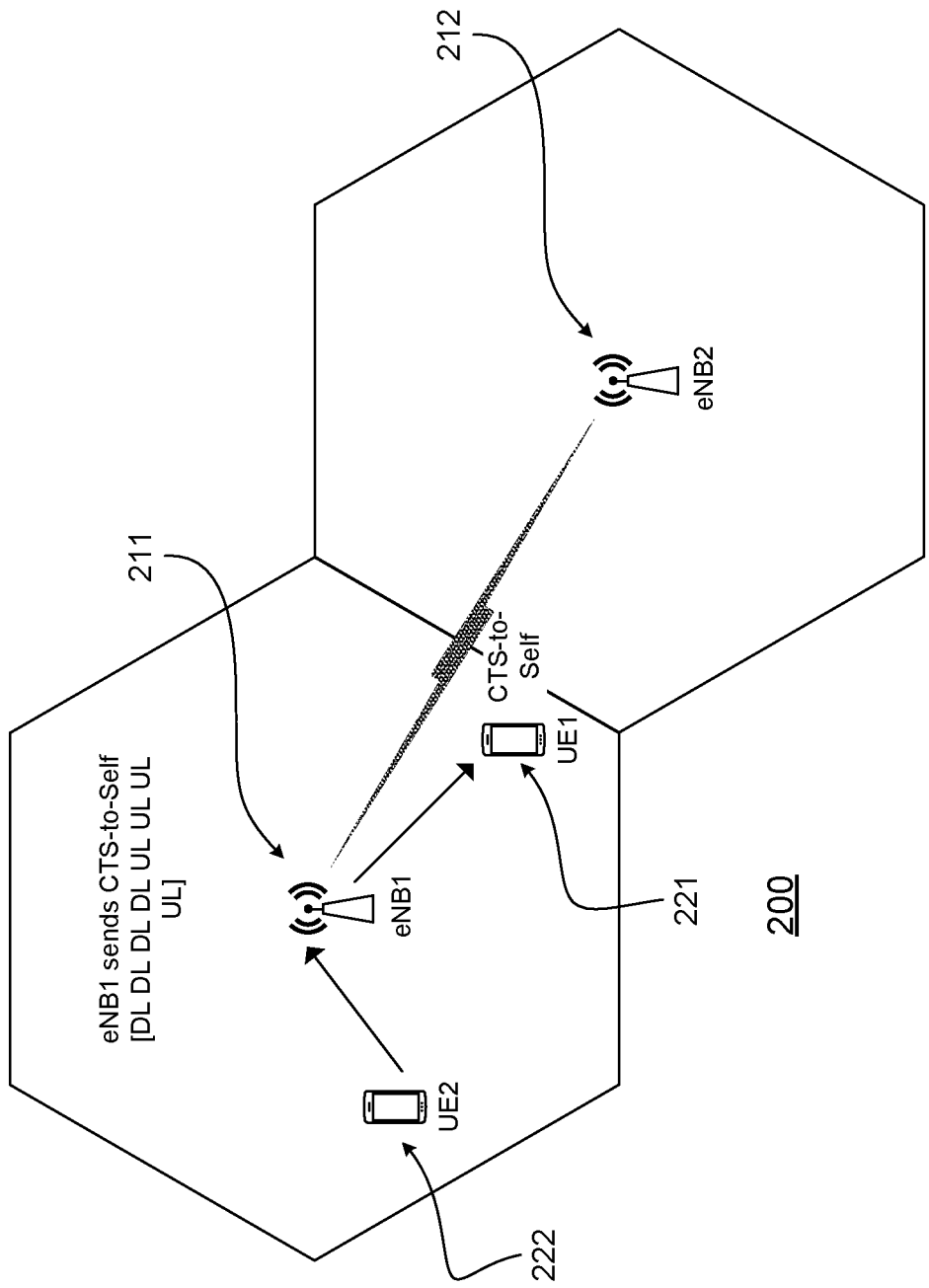
FIG. 2 illustrates a scenario of a co-existence network, in accordance with some embodiments of the disclosure.

FIG. 2 illustrates a scenario of a co-existence network, in accordance with some embodiments of the disclosure. A scenario 200 may comprise a first eNB 211, a second eNB 212, a first UE 221, and a second UE 222. First eNB 211 and second eNB 212 may be neighboring eNBs. First eNB 211 may be a serving eNB to first UE 221 and second UE 222, and second eNB 212 may be an interfering eNB to first UE 221 (which may be an edge UE). Second eNB 212 (especially interfering DL transmissions of second eNB 212) may cause interference to UL transmissions or DL transmissions of first UE 221.

In scenario 200, eight subframes may be scheduled by first eNB 211. The first four subframes may be scheduled for DL transmission (e.g., to first UE 221), while the next four subframes may be scheduled for UL transmission (e.g., from first UE 221). If second eNB 212 schedules DL transmission during the first four subframes, it may cause severe interference to first UE 221. To avoid this problem, second eNB 212 may schedule UL transmission, or may transmit DL data with reduced transmission power. Meanwhile, the last four subframes may be scheduled by first eNB 211 for UL transmission, and second eNB 212 may schedule either UL or transmit-power reduced DL.

The presence of an interfering eNB may be determined in various ways. In various embodiments, the presence of an interfering eNB may be determined by UE report, or by an eNB itself.

In the case of determining the presence of an interfering eNB by UE report, a victim UE (e.g., first UE 221) may measure a Downlink Reference Signal (DRS), or may measure one or more valid DL subframes within a DRS Transmission Window (DTxW) (up to including all valid DL subframes within a DTxW), or may measure any valid DL subframes of adjacent eNBs during a configured measurement gap, and may report the result to a serving eNB (e.g., first eNB 211). According to the results, the serving eNB (e.g., first eNB 211) may determine the presence of an interfering eNB in a UE-specific way (e.g., that second eNB 212 is an interfering eNB for first UE 221). First eNB 211 may then mute eNB 212 (e.g., the interfering eNB) when transmitting DL data to first UE 221 through a Clear-to-Send-to-self (CTS-to-self).

In the case of determining the presence of an interfering eNB by an eNB itself, a potentially-interfering eNB (e.g., second eNB 212) may calculate a receive power for a Clear-to-Send (CTS), and may estimate how much interference it may cause to an existing transmission. In some embodiments, a transmit power of a CTS may be predetermined or otherwise pre-defined, or may be configured by higher layers (e.g., SAS). For some embodiments, a threshold may be either predetermined or otherwise pre-defined, or may be configured by higher layers (e.g., SAS). Then, when a receive power of a CTS exceeds this threshold, a potentially-interfering eNB may be determined to be an interfering eNB.

A variety of embodiments may incorporate mechanisms and methods for UL transmission enhancement. In some embodiments, a potentially-interfering eNB (e.g., second eNB 212) may detect a CTS-to-self and observe that a DL transmission may cause interference to an existing UL or DL transmission, and the potentially-interfering eNB may thereby determine that it may be an interfering eNB. The interfering eNB may then schedule UL transmission, which may be either colliding with an existing UL transmission, or overlapped with an existing DL transmission. The first case may amount to a UL-to-UL interference scenario that might not present severe co-existence problems, while in the second case, an existing DL transmission may cause interference to a UL transmission.

In various embodiments, UL transmission enhancement accordance with a first option may comprise higher-layer configuration. In some embodiments, two UL power control parameters may be configured through higher-layer signaling. One power control parameter may be for a legacy UL power control, and the other power control parameter may be for a UL link enhancement upon colliding with an existing DL transmission.

In some embodiments, for the additional power control parameters, one or more parameters may be configured. In some embodiments, a targeted receive power may be configured. In some embodiments, $P_{O\_PUSCH,c}(j)$ may be configured (which may be a sum of $P_{O\_NOMINAL\_PUSCH,c}(j)$ Provided by higher layers and $P_{O\_UE\_PUSCH,c}(j)$ Provided by higher layers for a serving cell). In some embodiments, $\alpha_{0\_PUSCH,c}(j)$ may be configured (which may be related to $\alpha_c$, a 3-bit parameter provided by higher layers for a serving cell). In some embodiments, deltaMCS-Enabled may be configured (which may be provided by higher layers for a serving cell). In some embodiments, $\Delta_{TF,c}(i)$ may be configured. In some embodiments, $K_S$ may be configured. In some embodiments, $\beta_{offset}^{PUSCH}$ may be configured (which may be $\beta_{offset}^{CQI}$ A for control data sent via Physical Uplink Shared Channel (PUSCH) without UL Shared Channel (UL-SCH) data). In some embodiments, $f_c(i)$ may be configured (which may be a current PUSCH power control adjustment state for a serving cell).

For some embodiments, if some parameters are not additionally configured, legacy UL power control parameter may be reused by default.

In some embodiments, two sets of power control parameters may be configured via higher-layer signaling (e.g., Radio Resource Control (RRC) signaling), and Downlink Control Information (DCI) format 0A, DCI format 0B, DCI format 4A, and DCI format 4B may be extended to include N bits, which may indicate which set of power control parameters may be used for scheduled UL subframes. For example, N may equal "1," which may indicate that all UL subframes scheduled by a UL grant may use the same power control parameters. As another example, N may equal a number of scheduled UL subframes, which may indicate that the indicated number N of scheduled UL subframes may use a set of power control parameters.

For some embodiments, two sets of power control parameters may be configured via higher-layer signaling (e.g., via RRC). A Physical Downlink Control Channel (PDCCH) transmission (e.g., a common PDCCH (cPDCCH) transmission) may be extended to include N bits, which may indicate which subframes in a corresponding burst should use which set of power control parameters. For example, N may equal "1," which may indicate that a set of power control parameters should be used for all the UL subframes within the corresponding burst. As another example, N may equal "3," which may indicate a number of UL subframes within a corresponding burst that may use a first set of power control parameters, while other UL subframes within the corresponding burst may use a second set of power control parameters. As a further example, N may equal "6," which may indicate, as a bitmap, which set of UL power control parameters may be used for each UL subframe within the corresponding burst.

In various embodiments, UL transmission enhancement accordance with a second option may comprise dynamic configuration. In some embodiments, a bit length of a Transmission Power Control (TPC) indicator or field in the UL grant DCI (e.g., a DCI format 0A, a DCI format 0B, a DCI format 4A, or a DCI format 4B) may be extended. Merely one UL power control parameter may be configured by higher-layer signaling, and an eNB may dynamically adjust power control via the TPC in the UL grant DCI.

For some embodiments, the TPC may be used to adjust either an absolute transmit power of a UE, or an accumulated transmit power of a UE. In some embodiments, a 3-bit-length TPC may be configured in DCI and may indicate an absolute power offset in accordance with Table 1 below.

TABLE 1

Extended TPC Command and Absolute Power Adjustment

| TPC command field | absolute power adjustment [dB] |
|---|---|
| 0 | −1 |
| 1 | 0 |
| 2 | 1 |
| 3 | 3 |
| 4 | 5 |
| 5 | 7 |
| 6 | 9 |
| 7 | 11 |

Figure 3A:
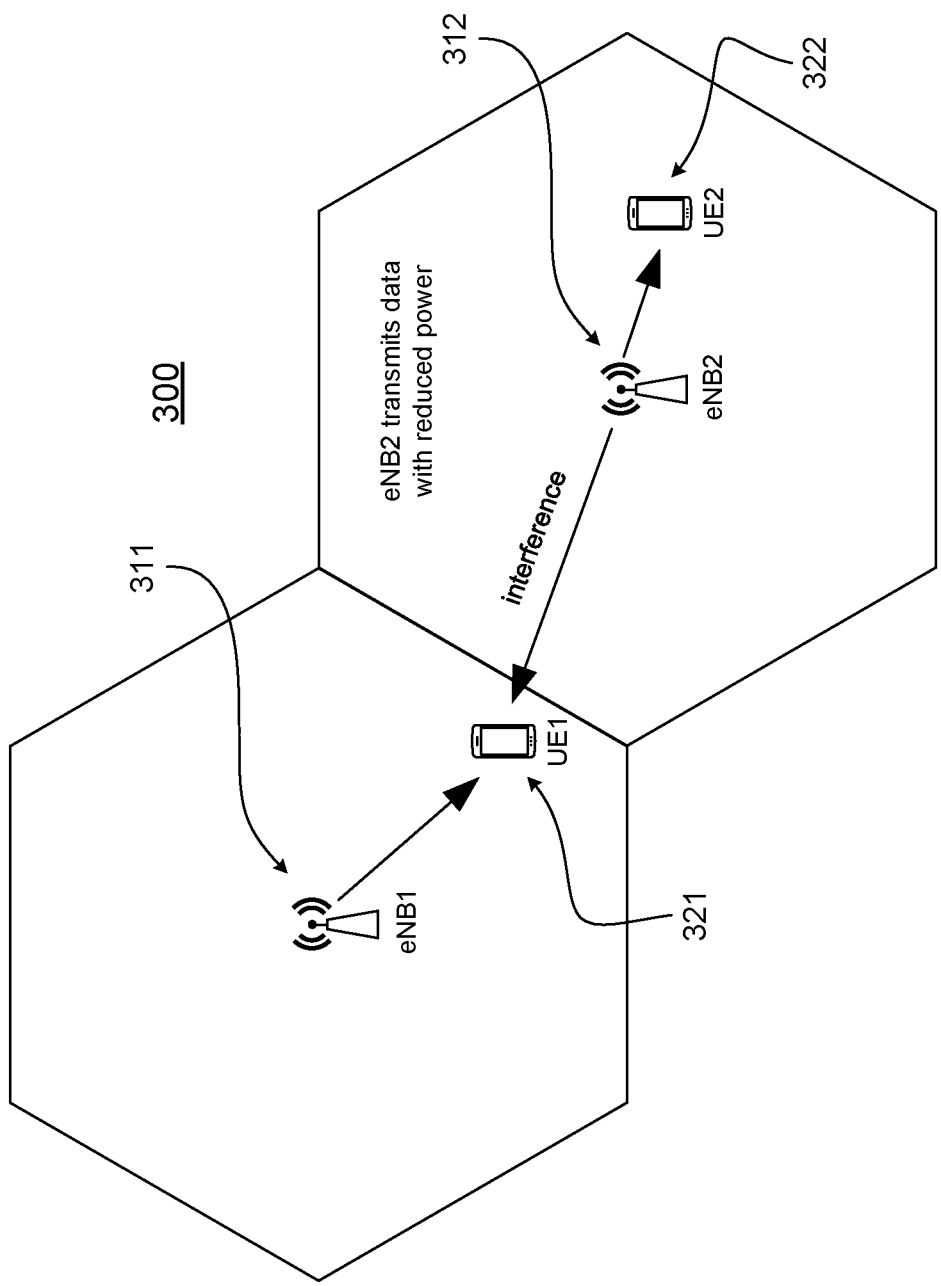
FIGS. 3A-3B illustrate scenarios of co-existence networks for reduced transmission power, in accordance with some embodiments of the disclosure.
Figure 3B:
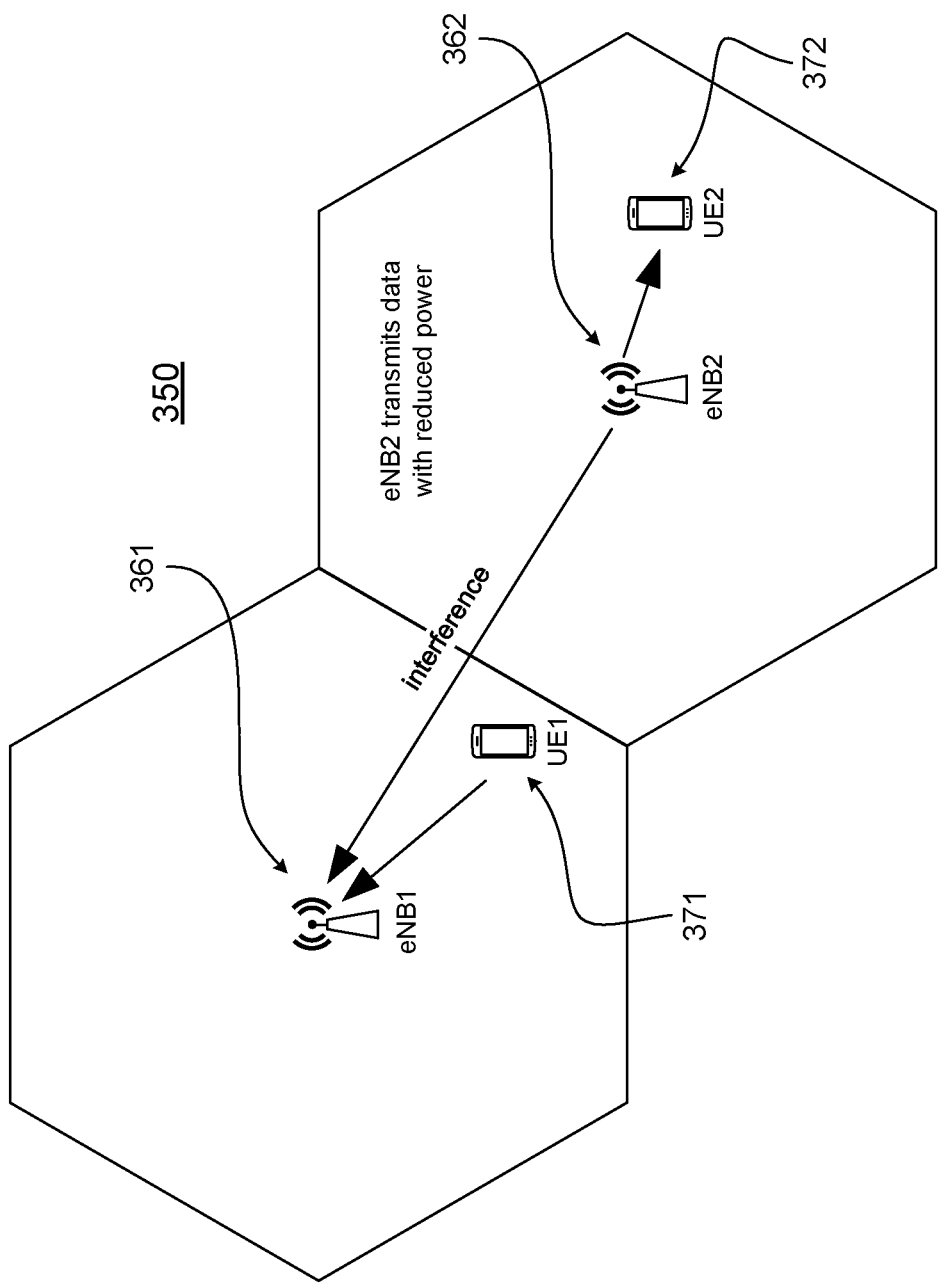

Meanwhile, a variety of embodiments may incorporate mechanisms and methods for reduced-power DL transmission. A potentially-interfering eNB (e.g., second eNB 212) may detect a CTS-to-self, and may observe that a DL transmission will cause interference to an existing UL or DL transmission, and the potentially-interfering eNB may thereby determine that it may be an interfering eNB. The interfering eNB may then transmit DL data to a center UE served by the interfering eNB (which may be determined by a reported power headroom) with reduced transmission power. FIGS. 3A-3B illustrate scenarios of co-existence networks for reduced transmission power, in accordance with some embodiments of the disclosure.

In various embodiments, in accordance with a first option, reduced-power DL transmission may comprise co-existence between a serving DL and a power-reduced interfering DL. With reference to FIG. 3A, a scenario 300 may comprise a first eNB 311, a second eNB 312, a first UE 321, and a second UE 322. First eNB 311 may be a serving eNB to first UE 321, and second eNB 312 may be a serving eNB to second UE 322. First UE 321 may be an edge UE (being close to an edge between a cell served by first eNB 311 and second eNB 312), while second UE 322 may be a center UE (being close to a central portion of a cell served by second eNB 312). DL transmissions from second eNB 312 may interfere with DL transmissions from first eNB 311 to first UE 321, and for that reason second eNB 312 may accordingly be an interfering eNB to first UE 321.

In scenario 300, an interfering DL transmission with reduced transmission power (e.g., from second eNB 312) may collide with an existing DL transmission to an edge UEs (e.g., from first eNB 311 to first UE 321). In some embodiments, first UE 311 (which may be termed a victim UE) may report a Reference Signal Receive Power (RSRP) of the interfering eNB (e.g., second eNB 312) to the serving eNB (e.g., first eNB 311), and the serving eNB may estimate how much it may reduce its transmission power. For some embodiments, a victim UE may measure, e.g., a ratio between interference and signal (I/S), and may report the I/S to the serving eNB. The I/S may be utilized to estimate how much the interfering eNB's transmission power needs to be reduced. In some embodiments, the I/S may be quantized and reported, such as in the three-bit quantized field defined in Table 2 below.

TABLE 2

| quantized field | I/S Value |
|---|---|
| 0 | −4 |
| 1 | −2 |
| 2 | 0 |
| 3 | 4 |
| 4 | 8 |
| 5 | 10 |
| 6 | >10 |
| 7 | reserved |

Reported I/S

In some embodiments, after a serving eNB (e.g., first eNB 311) estimates a reduced power quantity, it may transmit the reduced power quantity in a CTS-to-self (which may comprise, e.g., a target interfering eNB index, plus the reduced power quantity).

For some embodiments, a bit-field for power reduction in a CTS-to-self may be a field corresponding to various predetermined or otherwise pre-defined values, or SAS-configured values, such as the two-bit field defined in Table 3 below.

TABLE 3 power reduction

| bit field in CTS-to-self | behavior |
|---|---|
| 0 | muting |
| 1 | the $1^{st}$ pre-defined or SAS-configured value (e.g., 3 dB power reduction) |
| 2 | a $2^{nd}$ pre-defined or SAS-configured value (e.g., 5 dB power reduction) |
| 3 | a $3^{rd}$ pre-defined or SAS-configured value (e.g., 10 dB power reduction) |

In various embodiments, in accordance with a second option, reduced-power DL transmission may comprise co-existence between a serving UL and a power-reduced interfering DL. With reference to FIG. 3B, a scenario 350 may comprise a first eNB 361, a second eNB 362, a first UE 371, and a second UE 372. First eNB 361 may be a serving eNB to first UE 371, and second eNB 362 may be a serving eNB to second UE 372. First UE 371 may be an edge UE (being close to an edge between a cell served by first eNB 361 and second eNB 362), while second UE 372 may be a center UE (being close to a central portion of a cell served by second eNB 362). DL transmissions from second eNB 362 may interfere with UL transmissions from first UE 371 to first eNB 361, and for that additional reason second eNB 362 may accordingly be an interfering eNB to first UE 371.

An interfering DL transmission with reduced transmission power may collide with an existing DL transmission to an edge UEs (e.g., from first eNB 361 to first UE 371). In this case, the serving eNB (e.g., first eNB 361) may estimate an I/S by itself, and calculate how much transmission power of an interfering cell may advantageously be reduced. After it calculates a reduced power, it may be transmitted in the CTS-to-self (as disclosed herein).

Figure 4:
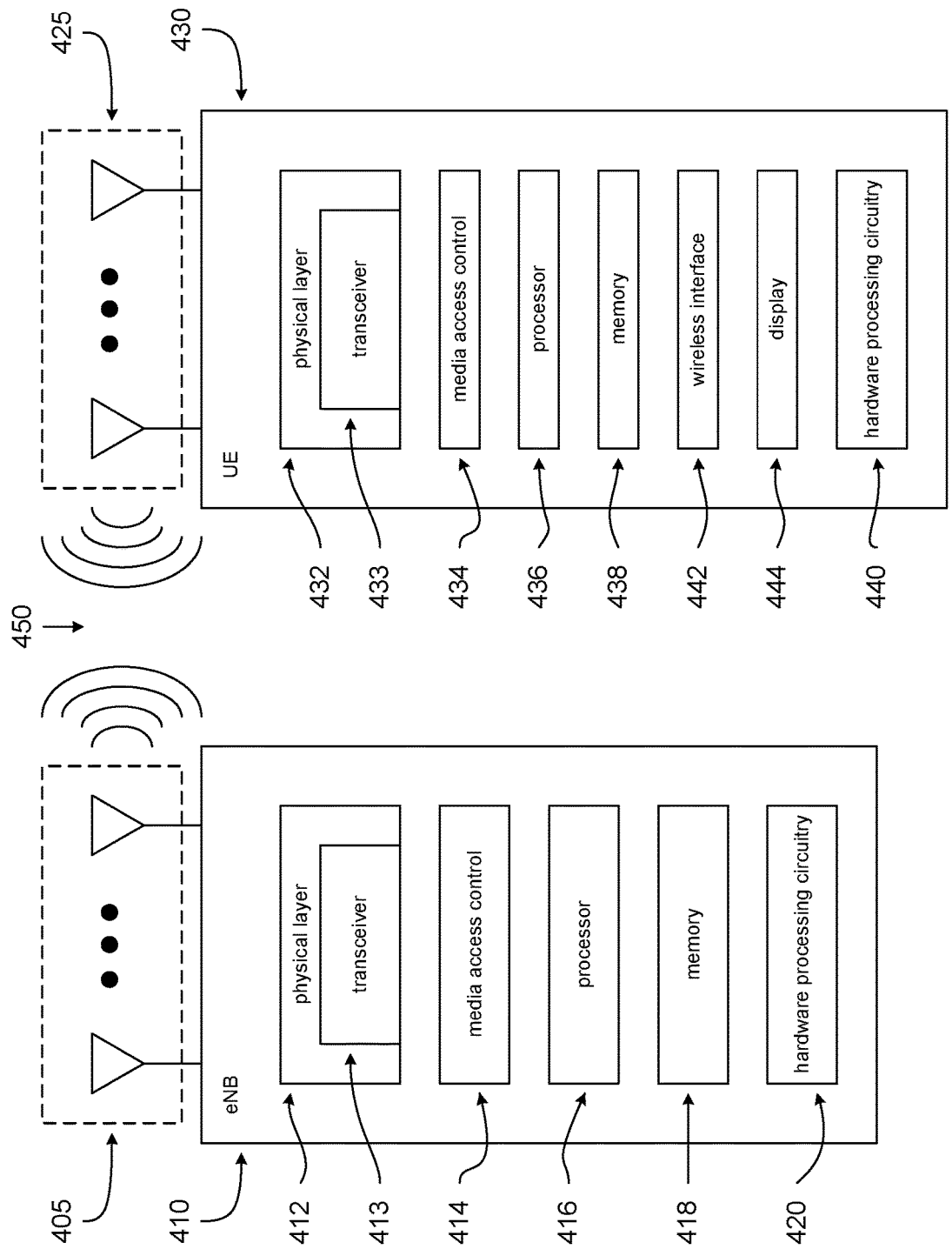
FIG. 4 illustrates an Evolved Node B (eNB) and a User Equipment (UE), in accordance with some embodiments of the disclosure.

FIG. 4 illustrates an eNB and a UE, in accordance with some embodiments of the disclosure. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 5:
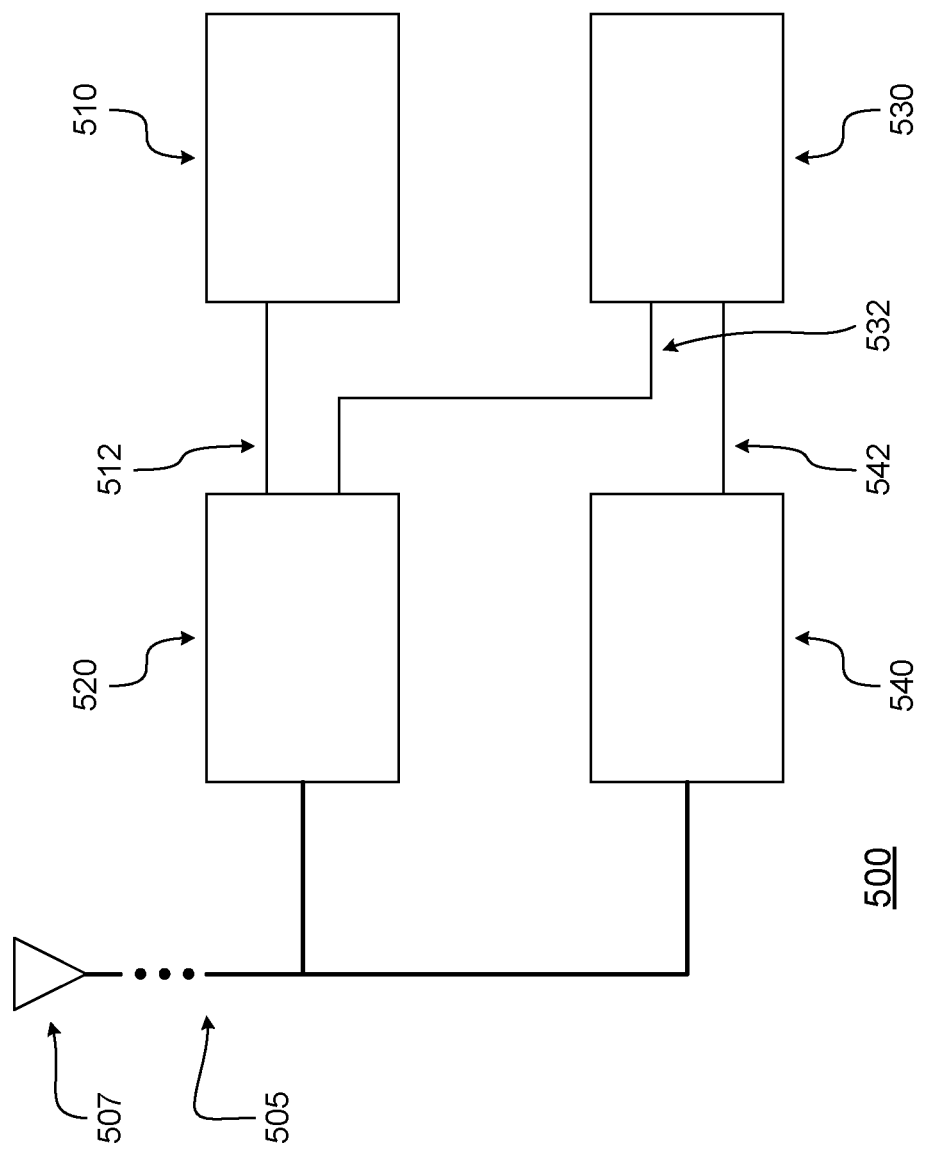
FIG. 5 illustrates hardware processing circuitries for a UE for UL transmission enhancement, in accordance with some embodiments of the disclosure.

FIG. 5 illustrates hardware processing circuitries for a UE for UL transmission enhancement, in accordance with some embodiments of the disclosure. With reference to FIG. 4, a UE may include various hardware processing circuitries discussed herein (such as hardware processing circuitry 500 of FIG. 5), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 5, an apparatus of UE 430 (or another UE or mobile handset), which may be operable to communicate with one or more eNBs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 425). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from a UE to a wireless communications channel and/or an eNB, and may be operable to provide signals from an eNB and/or a wireless communications channel to a UE. For example, antenna ports 505 and antennas 507 may be operable to provide transmissions from UE 430 to wireless communication channel 450 (and from there to eNB 410, or to another eNB). Similarly, antennas 507 and antenna ports 505 may be operable to provide transmissions from a wireless communication channel 450 (and beyond that, from eNB 410, or another eNB) to UE 430.

Hardware processing circuitry 500 may comprise various circuitries operable in accordance with the various embodiments discussed herein. With reference to FIG. 5, hardware processing circuitry 500 may comprise a first circuitry 510, a second circuitry 520, a third circuitry 530, and/or a fourth circuitry 540. First circuitry 510 may be operable to establish that DL transmissions from the second eNB will interfere in one or more subframes with UL transmissions from the UE to the first eNB. Second circuitry 520 may be operable to modulate a UL transmission power based upon the established interference condition. First circuitry 510 may be operable to provide an indicator of the established interference condition to second circuitry 520 via an interface 512. Hardware processing circuitry 500 may also comprise an interface for receiving DL transmissions from a receiving circuitry and for sending UL transmissions to a transmission circuitry.

In some embodiments, third circuitry 530 may be operable to measure a first DL transmission from the first eNB to determine a first measurement and to measure a second DL transmission from the second eNB to determine a second measurement. Second circuitry 520 may be additionally operable to report the first measurement and the second measurement to the first eNB to establish that DL transmissions from the second eNB will interfere in one or more subframes with UL transmissions from the UE to the first eNB. Third circuitry 530 may be operable to provide indicators of the first measurement and/or the second measurement to second circuitry 520 via an interface 532.

For some embodiments, fourth circuitry 540 may be operable to process a first DL configuration transmission from the first eNB carrying indicators of two or more sets of power control parameters. In some embodiments, the first DL configuration transmission may be an RRC transmission, a DCI format 0A transmission, a DCI format 0B transmission, a DCI format 4A transmission, a DCI format 4B transmission, or a PDCCH transmission.

In some embodiments, fourth circuitry 540 may be operable to process a second DL configuration transmission from the first eNB carrying an indicator of which set of power control parameters to use during scheduled UL subframes. For some embodiments, fourth circuitry 540 may be operable to process a third DL configuration transmission from the first eNB carrying an indicator of which UL subframes are for use of a set of power control parameters.

For some embodiments, the first DL configuration transmission may be a DCI transmission, and a DCI of the first DL configuration may carry a TPC indicator for an absolute transmission power of the UE and/or an accumulated transmit power of the UE.

In some embodiments, fourth circuitry 540 may be operable to process a fourth DL configuration transmission from the first eNB carrying indicators of one or more power control parameters. Fourth circuitry 540 may be operable to provide to third circuitry 530 indicators of power control parameters, indicators of sets of power control parameters, indicators of which UL subframes are for use of a set of power control parameters, and/or indicators of which set of power control parameters to use during scheduled UL subframes via an interface 542.

In some embodiments, first circuitry 510, second circuitry 520, third circuitry 530, and/or fourth circuitry 540 may be implemented as separate circuitries. In other embodiments, first circuitry 510, second circuitry 520, third circuitry 530, and/or fourth circuitry 540 may be combined and implemented together in a circuitry without altering the essence of the embodiments.

Figure 6:
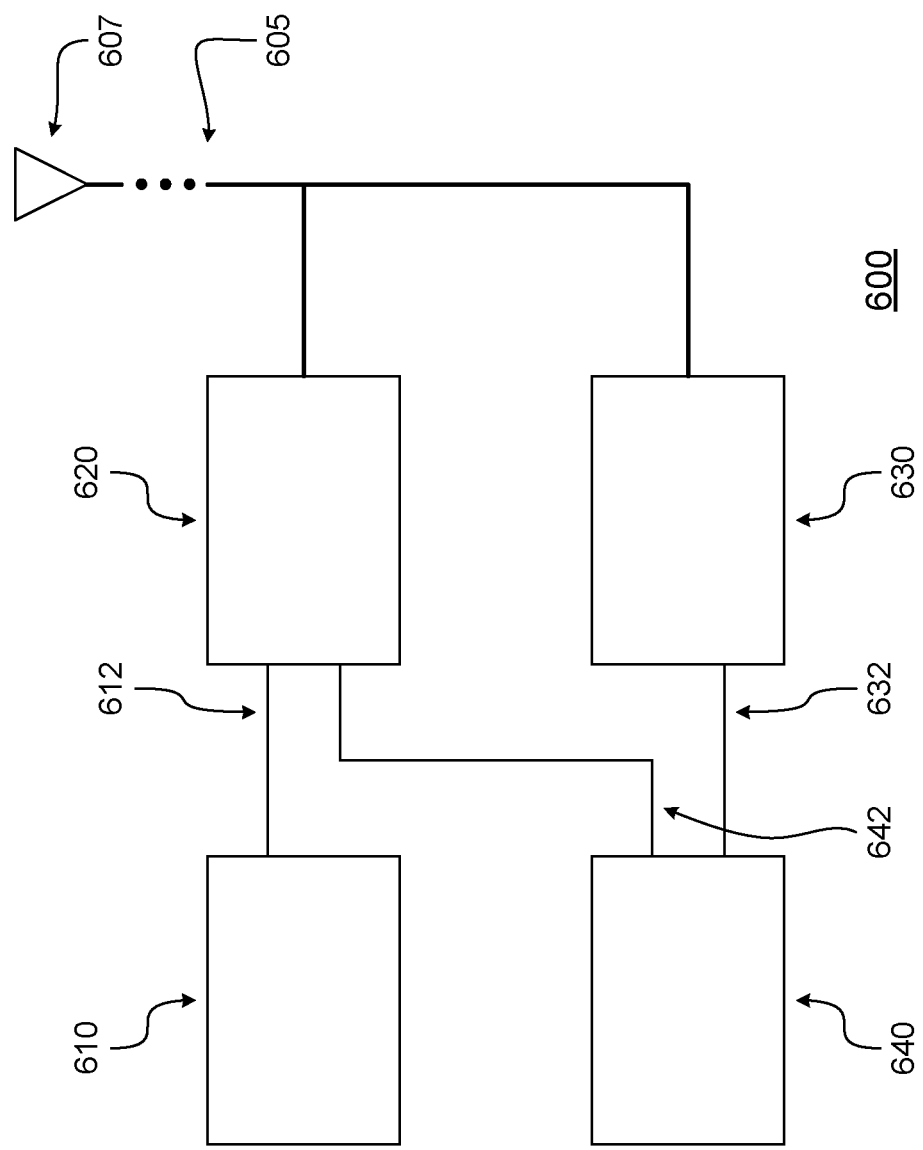
FIG. 6 illustrates hardware processing circuitries for an eNB for reduced-power DL transmission, in accordance with some embodiments of the disclosure.

FIG. 6 illustrates hardware processing circuitries for an eNB for reduced-power DL transmission, in accordance with some embodiments of the disclosure. With reference to FIG. 4, an eNB may include various hardware processing circuitries discussed herein (such as hardware processing circuitry 600 of FIG. 6), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 6, an apparatus of eNB 410 (or another eNB or base station), which may be operable to communicate with one or more UEs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 405). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from an eNB to a wireless communications channel and/or a UE, and may be operable to provide signals from a UE and/or a wireless communications channel to an eNB. For example, antenna ports 605 and antennas 607 may be operable to provide transmissions from eNB 410 to wireless communication channel 450 (and from there to UE 430, or to another UE). Similarly, antennas 607 and antenna ports 605 may be operable to provide transmissions from a wireless communication channel 450 (and beyond that, from UE 430, or another UE) to eNB 410.

Hardware processing circuitry 600 may comprise various circuitries operable in accordance with the various embodiments discussed herein. With reference to FIG. 6, hardware processing circuitry 600 may comprise a first circuitry 610, a second circuitry 620, a third circuitry 630, and/or a fourth circuitry 640. First circuitry 610 may be operable to establish that DL transmissions from the eNB will interfere in one or more subframes with UL transmissions from the UE to another eNB. Second circuitry 620 may be operable to modify a DL transmission based upon the established interference condition. First circuitry 610 may be operable to provide an indicator of the established interference condition to second circuitry 620 via an interface 612. Hardware processing circuitry 600 may comprise an interface for sending DL transmissions to a transmitting circuitry and for receiving UL transmissions from a transmission circuitry.

In some embodiments, third circuitry 630 may be operable to calculate a receive power of a CTS transmission and/or to estimate an interference level of the CTS transmission.

For some embodiments, fourth circuitry 640 may be operable to determine whether the estimated interference level exceeds a reference interference level to establish that DL transmissions from the eNB will interfere in one or more subframes with UL transmissions from the UE to another eNB. Third circuitry 630 may be operable to provide an indicator of an estimated interference level to fourth circuitry 640 via an interface 632, and fourth circuitry 640 may be operable to provide an indicator of the established interference condition to second circuitry 620 via an interface 642. In some embodiments, the reference interference level may be a predetermined interference level, or an interference level configured by higher layers.

In some embodiments, second circuitry 620 may be additionally operable to modify the DL transmission to have a reduced transmission power based on the established interference condition. For some embodiments, second circuitry 620 may be additionally operable to generate a CTS-to-self transmission carrying an indicator of the transmission power reduction.

For some embodiments, the indicator of transmission power reduction may have one or more values indicating a respectively corresponding set of one or more predetermined power reduction values.

In some embodiments, first circuitry 610, second circuitry 620, third circuitry 630, and/or fourth circuitry 640 may be implemented as separate circuitries. In other embodiments, first circuitry 610, second circuitry 620, third circuitry 630, and/or fourth circuitry 640 may be combined and implemented together in a circuitry without altering the essence of the embodiments.

Figure 7:
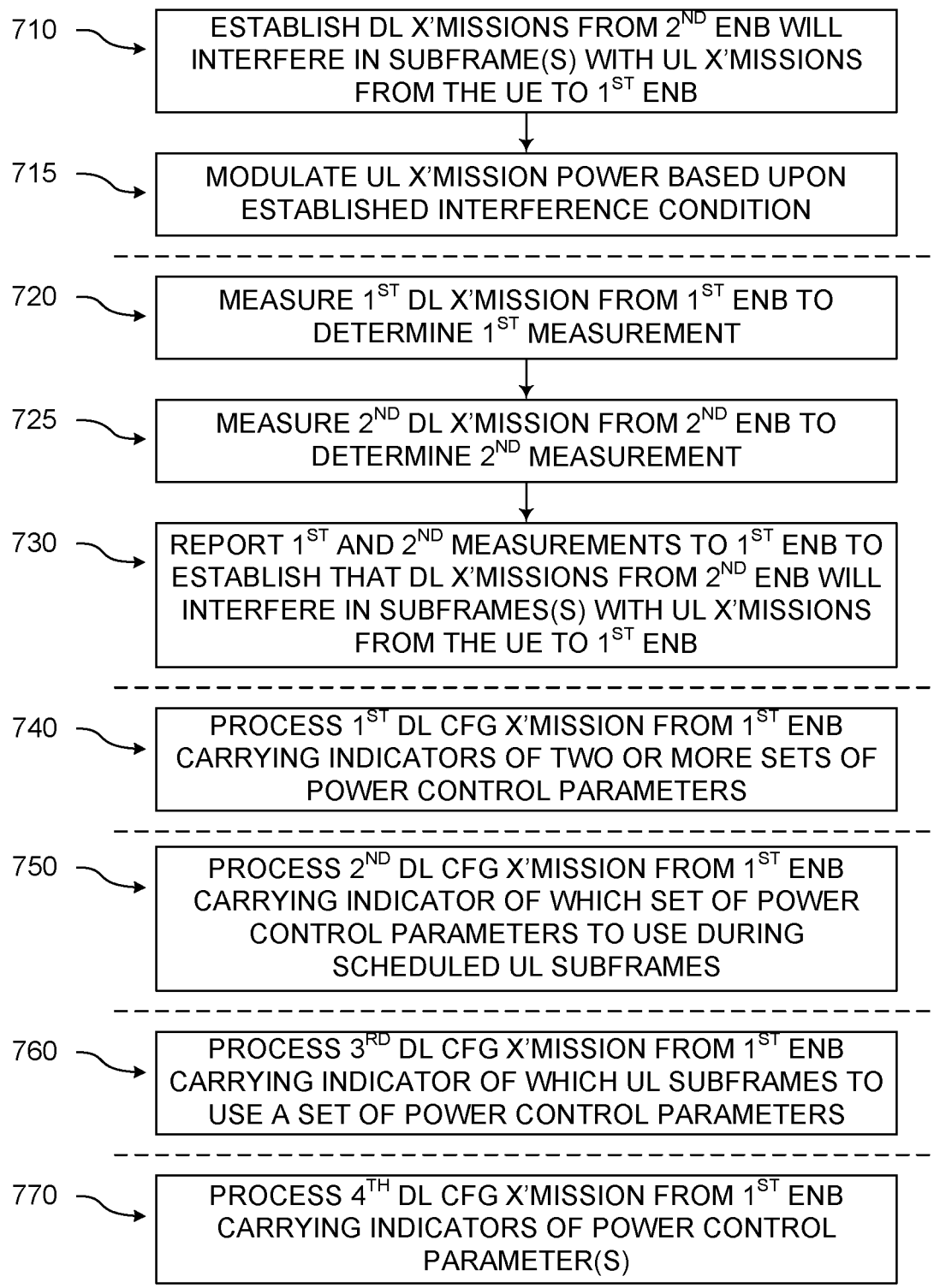
FIG. 7 illustrates methods for a UE for UL transmission enhancement, in accordance with some embodiments of the disclosure.

FIG. 7 illustrates methods for a UE for UL transmission enhancement, in accordance with some embodiments of the disclosure. With reference to FIG. 4, methods that may relate to UE 430 and hardware processing circuitry 440 are discussed herein. Although the actions in method 700 of FIG.

7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, various methods may be in accordance with the various embodiments discussed herein. A method 700 may comprise an establishing 710 and a modulating 715. Method 700 may also comprise a measuring 720, a measuring 725, a reporting 730, a processing 740, a processing 750, a processing 760, and/or a processing 770.

In establishing 710, it may be established that DL transmissions from the second eNB will interfere in one or more subframes with UL transmissions from the UE to the first eNB. In modulating 710, a UL transmission power may be modulated based upon the established interference condition.

In some embodiments, in measuring 720, a first DL transmission from the first eNB may be measured to determine a first measurement. For some embodiments, in measuring 725, a second DL transmission from the second eNB may be measured to determine a second measurement. In some embodiments, in reporting 730, the first measurement and the second measurement may be reported to the first eNB to establish that DL transmissions from the second eNB will interfere in one or more subframes with UL transmissions from the UE to the first eNB.

For some embodiments, in processing 740, a first DL configuration transmission from the first eNB carrying indicators of two or more sets of power control parameters may be processed. The first DL configuration transmission may be an RRC transmission, a DCI format 0A transmission, a DCI format 0B transmission, a DCI format 4A transmission, a DCI format 4B transmission, or a PDCCH transmission.

In some embodiments, in processing 750, a second DL configuration transmission from the first eNB carrying an indicator of which set of power control parameters to use during scheduled UL subframes may be processed. For some embodiments, in processing 760, a third DL configuration transmission from the first eNB carrying an indicator of which UL subframes are for use of a set of power control parameters may be processed.

For some embodiments, the first DL configuration transmission may be a DCI transmission, and a DCI of the first DL configuration may carry a TPC indicator for an absolute transmission power of the UE and/or an accumulated transmit power of the UE.

In some embodiments, in processing 770, a fourth DL configuration transmission from the first eNB carrying indicators of one or more power control parameters may be processed.

Figure 8:
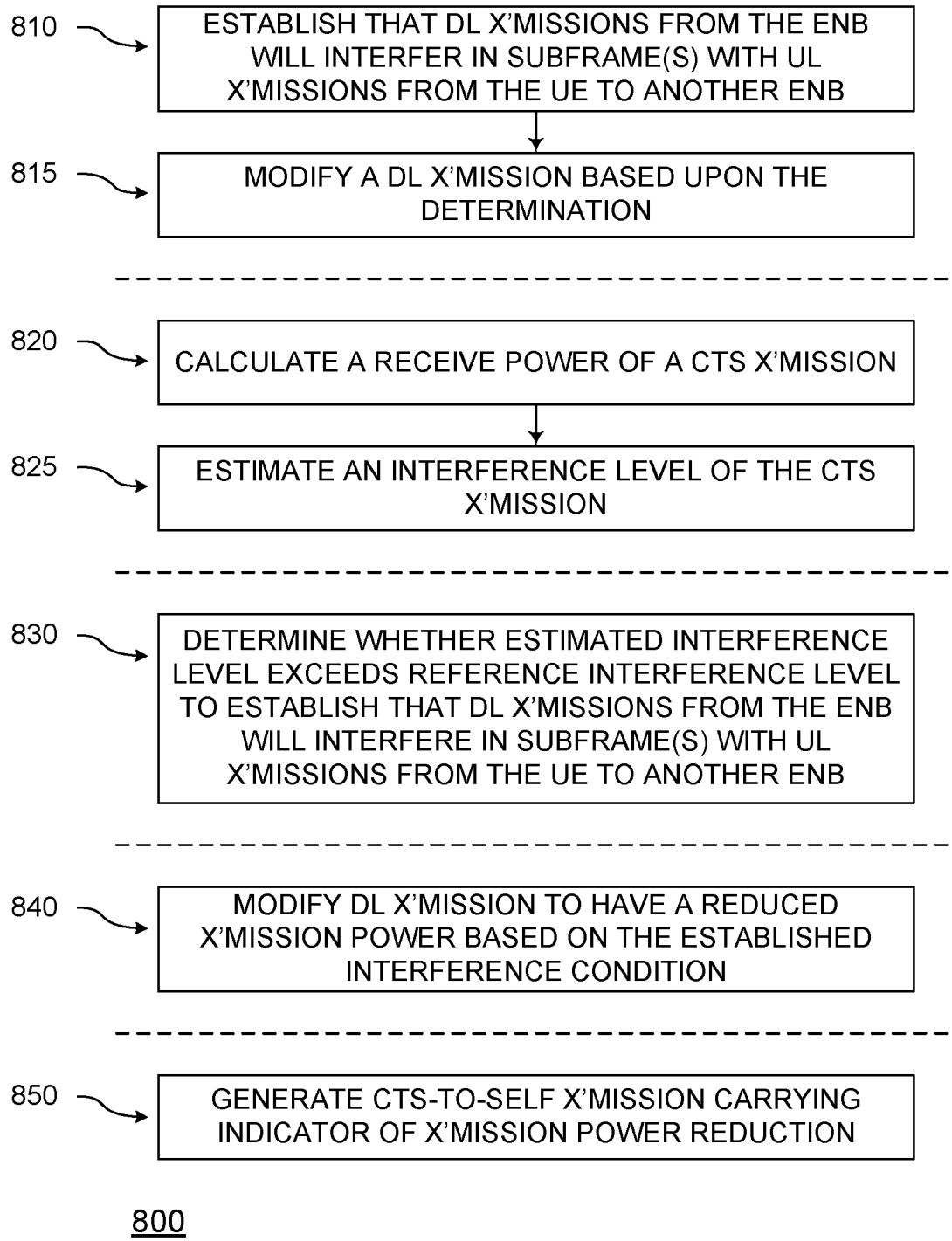
FIG. 8 illustrates methods for an eNB for reduced-power DL transmission, in accordance with some embodiments of the disclosure.

FIG. 8 illustrates methods for an eNB for reduced-power DL transmission, in accordance with some embodiments of the disclosure. With reference to FIG. 4, various methods that may relate to eNB 410 and hardware processing circuitry 420 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 410 and/or hardware processing circuitry 420 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, various methods may be in accordance with the various embodiments discussed herein. A method 800 may comprise an establishing 810 and a modifying 815. Method 800 may also comprise a calculating 820, an estimating 825, a determining 830, a modifying 840, and/or a generating 850.

In establishing 810, it may be established that DL transmissions from the eNB will interfere in one or more subframes with UL transmissions from the UE to another eNB. In modifying 815, a DL transmission may be modified based upon the established interference condition.

In some embodiments, in calculating 820, a receive power of a CTS transmission may be calculated. In estimating 825, an interference level of the CTS transmission may be estimated.

For some embodiments, in determining 830, whether the estimated interference level exceeds a reference interference level may be determined to establish that DL transmissions from the eNB will interfere in one or more subframes with UL transmissions from the UE to another eNB. In some embodiments, the reference interference level may be a predetermined interference level, or an interference level configured by higher layers.

In some embodiments, in modifying 840, the DL transmission may be modified to have a reduced transmission power based on the established interference condition. For some embodiments, in generating 850, a CTS-to-self transmission carrying an indicator of the transmission power reduction may be generated.

For some embodiments, the indicator of transmission power reduction may have one or more values indicating a respectively corresponding set of one or more predetermined power reduction values.

Figure 9:
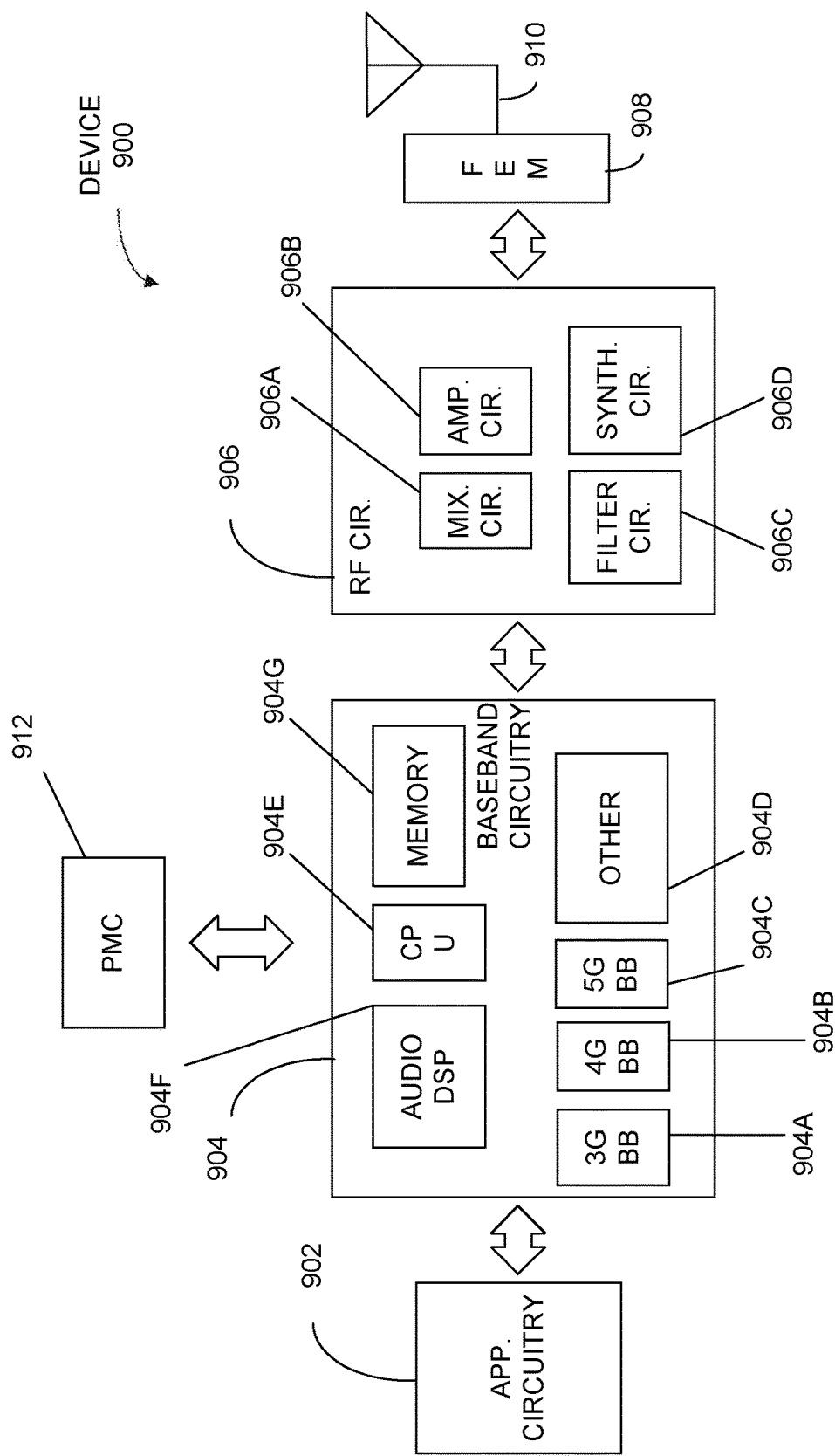
FIG. 9 illustrates example components of a device, in accordance with some embodiments of the disclosure.

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
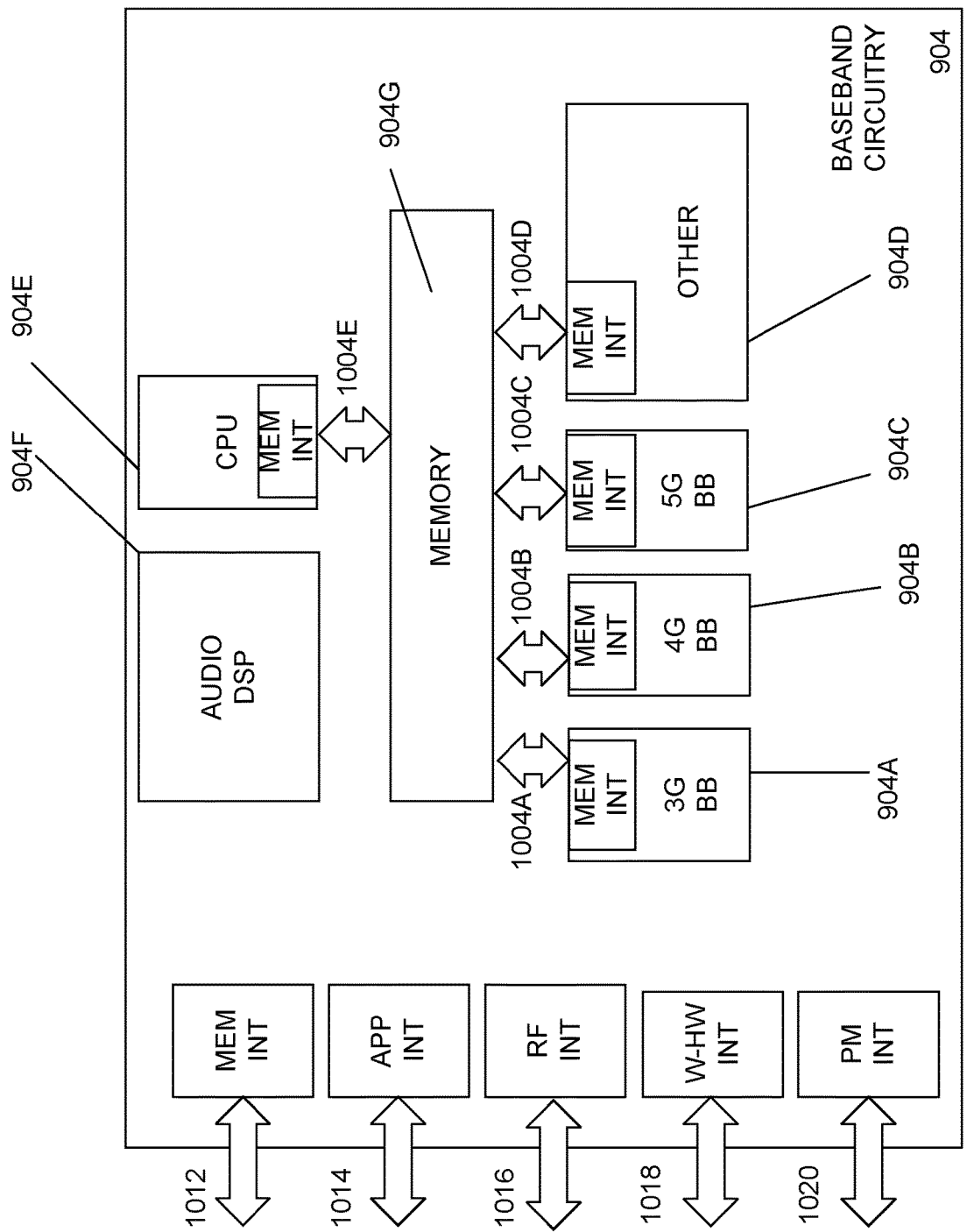
FIG. 10 illustrates example interfaces of baseband circuitry, in accordance with some embodiments of the disclosure.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a first Evolved Node B (eNB) and a second eNB over an unlicensed spectrum on a wireless network, comprising: one or more processors to: establish that Downlink (DL) transmissions from the second eNB will interfere in one or more subframes with Uplink (UL) transmissions from the UE to the first eNB; and modulate a UL transmission power based upon the established interference condition, and an interface for receiving DL transmissions from a receiving circuitry and for sending UL transmissions to a transmission circuitry.

In example 2, the apparatus of example 1, wherein the one or more processors are to: measure a first DL transmission from the first eNB to determine a first measurement; measure a second DL transmission from the second eNB to determine a second measurement; and report the first measurement and the second measurement to the first eNB to establish that DL transmissions from the second eNB will interfere in one or more subframes with UL transmissions from the UE to the first eNB.

In example 3, the apparatus of any of examples 1 through 2, wherein the one or more processors are to: process a first DL configuration transmission from the first eNB carrying indicators of two or more sets of power control parameters.

In example 4, the apparatus of example 3, wherein the first DL configuration transmission is one of: a Radio Resource Control (RRC) transmission, a Downlink Control Information (DCI) format 0A transmission, a DCI format 0B transmission, a DCI format 4A transmission, a DCI format 4B transmission, or a Physical Downlink Control Channel (PDCCH) transmission.

In example 5, the apparatus of any of examples 3 through 4, wherein the one or more processors are to: process a second DL configuration transmission from the first eNB carrying an indicator of which set of power control parameters to use during scheduled UL subframes.

In example 6, the apparatus of any of examples 3 through 5, wherein the one or more processors are to: process a third DL configuration transmission from the first eNB carrying an indicator of which UL subframes are for use of a set of power control parameters.

In example 7, the apparatus of any of examples 3 through 6, wherein the first DL configuration transmission is a Downlink Control Information (DCI) transmission; and wherein a DCI of the first DL configuration carries a Transmission Power Control (TPC) indicator for one of: an absolute transmission power of the UE, or an accumulated transmit power of the UE.

In example 8, the apparatus of any of examples 1 through 7, wherein the one or more processors are to: process a fourth DL configuration transmission from the first eNB carrying indicators of one or more power control parameters.

Example 9 provides a User Equipment (UE) device comprising an application processor, a memory, one or more antennas, a wireless interface for allowing the application processor to communicate with another device, and a touch-screen display, the UE device including the apparatus of any of examples 1 through 8.

Example 10 provides a method comprising: establishing, for a User Equipment (UE) operable to communicate with a first Evolved Node B (eNB) and a second eNB over an unlicensed spectrum on a wireless network, that Downlink (DL) transmissions from the second eNB will interfere in one or more subframes with Uplink (UL) transmissions from the UE to the first eNB; and modulating a UL transmission power based upon the established interference condition.

In example 11, the method of example 10, comprising: measuring a first DL transmission from the first eNB to determine a first measurement; measuring a second DL transmission from the second eNB to determine a second measurement; and reporting the first measurement and the second measurement to the first eNB to establish that DL transmissions from the second eNB will interfere in one or more subframes with UL transmissions from the UE to the first eNB.

In example 12, the method of any of examples 10 through 11, comprising: processing a first DL configuration transmission from the first eNB carrying indicators of two or more sets of power control parameters.

In example 13, the method of example 12, wherein the first DL configuration transmission is one of: a Radio Resource Control (RRC) transmission, a Downlink Control Information (DCI) transmission, a DCI format 0A transmission, a DCI format 0B transmission, a DCI format 4A transmission, a DCI format 4B transmission, or a Physical Downlink Control Channel (PDCCH) transmission.

In example 14, the method of any of examples 12 through 13, comprising: processing a second DL configuration transmission from the first eNB carrying an indicator of which set of power control parameters to use during scheduled UL subframes.

In example 15, the method of any of examples 12 through 14, comprising: processing a third DL configuration transmission from the first eNB carrying an indicator of which UL subframes are for use of a set of power control parameters.

In example 16, the method of any of examples 29 through 15, wherein the first DL configuration transmission is a Downlink Control Information (DCI) transmission; and wherein a DCI of the first DL configuration carries a Transmission Power Control (TPC) indicator for one of: an absolute transmission power of the UE, or an accumulated transmit power of the UE.

In example 17, the method of any of examples 10 through 16, comprising: processing a fourth DL configuration transmission from the first eNB carrying indicators of one or more power control parameters.

Example 18 provides machine readable storage media having machine executable instructions stored thereon that, when executed, cause one or more processors to perform a method according to any of examples 10 through 17.

Example 19 provides an apparatus of a User Equipment (UE) operable to communicate with a first Evolved Node B (eNB) and a second eNB over an unlicensed spectrum on a wireless network, comprising: means for establishing that Downlink (DL) transmissions from the second eNB will interfere in one or more subframes with Uplink (UL) transmissions from the UE to the first eNB; and means for modulating a UL transmission power based upon the established interference condition.

In example 20, the apparatus of example 19, comprising: means for measuring a first DL transmission from the first eNB to determine a first measurement; means for measuring a second DL transmission from the second eNB to determine a second measurement; and means for reporting the first measurement and the second measurement to the first eNB to establish that DL transmissions from the second eNB will interfere in one or more subframes with UL transmissions from the UE to the first eNB.

In example 21, the apparatus of any of examples 19 through 20, comprising: means for processing a first DL configuration transmission from the first eNB carrying indicators of two or more sets of power control parameters.

In example 22, the apparatus of example 21, wherein the first DL configuration transmission is one of: a Radio Resource Control (RRC) transmission, a Downlink Control Information (DCI) format 0A transmission, a DCI format 0B transmission, a DCI format 4A transmission, a DCI format 4B transmission, or a Physical Downlink Control Channel (PDCCH) transmission.

In example 23, the apparatus of any of examples 21 through 22, comprising: means for processing a second DL configuration transmission from the first eNB carrying an indicator of which set of power control parameters to use during scheduled UL subframes.

In example 24, the apparatus of any of examples 21 through 23, comprising: means for processing a third DL configuration transmission from the first eNB carrying an indicator of which UL subframes are for use of a set of power control parameters.

In example 25, the apparatus of any of examples 21 through 24, wherein the first DL configuration transmission is a Downlink Control Information (DCI) transmission; and wherein a DCI of the first DL configuration carries a Transmission Power Control (TPC) indicator for one of: an absolute transmission power of the UE, or an accumulated transmit power of the UE.

In example 26, the apparatus of any of examples 19 through 25, comprising: means for processing a fourth DL configuration transmission from the first eNB carrying indicators of one or more power control parameters.

Example 27 provides machine readable storage media having machine executable instructions that, when executed, cause one or more processors of a User Equipment (UE) operable to communicate with a first Evolved Node B (eNB) and a second eNB over an unlicensed spectrum on a wireless network to perform an operation comprising: establish that Downlink (DL) transmissions from the second eNB will interfere in one or more subframes with Uplink (UL) transmissions from the UE to the first eNB; and modulate a UL transmission power based upon the established interference condition.

In example 28, the machine readable storage media of example 27, the operation comprising: measure a first DL transmission from the first eNB to determine a first measurement; measure a second DL transmission from the second eNB to determine a second measurement; and report the first measurement and the second measurement to the first eNB to establish that DL transmissions from the second eNB will interfere in one or more subframes with UL transmissions from the UE to the first eNB.

In example 29, the machine readable storage media of any of examples 27 through 28, the operation comprising: process a first DL configuration transmission from the first eNB carrying indicators of two or more sets of power control parameters.

In example 30, the machine readable storage media of example 29, wherein the first DL configuration transmission is one of: a Radio Resource Control (RRC) transmission, a Downlink Control Information (DCI) format 0A transmission, a DCI format 0B transmission, a DCI format 4A transmission, a DCI format 4B transmission, or a Physical Downlink Control Channel (PDCCH) transmission.

In example 31, the machine readable storage media of any of examples 29 through 30, the operation comprising: process a second DL configuration transmission from the first eNB carrying an indicator of which set of power control parameters to use during scheduled UL subframes.

In example 32, the machine readable storage media of any of examples 29 through 31, the operation comprising: process a third DL configuration transmission from the first eNB carrying an indicator of which UL subframes are for use of a set of power control parameters.

In example 33, the machine readable storage media of any of examples 29 through 32, wherein the first DL configuration transmission is a Downlink Control Information (DCI) transmission; and wherein a DCI of the first DL configuration carries a Transmission Power Control (TPC) indicator for one of: an absolute transmission power of the UE, or an accumulated transmit power of the UE.

In example 34, the machine readable storage media of any of examples 27 through 33, the operation comprising: process a fourth DL configuration transmission from the first eNB carrying indicators of one or more power control parameters.

Example 35 provides an apparatus of an Evolved Node B (eNB) operable to communicate with a User Equipment (UE) over an unlicensed spectrum on a wireless network, comprising: one or more processors to: establish that Downlink (DL) transmissions from the eNB will interfere in one or more subframes with Uplink (UL) transmissions from the UE to another eNB; and modify a DL transmission based upon the established interference condition, and an interface for sending DL transmissions to a transmitting circuitry and for receiving UL transmissions from a transmission circuitry.

In example 36, the apparatus of example 35, wherein the one or more processors are to: calculate a receive power of a Clear to Send (CTS) transmission; and estimate an interference level of the CTS transmission.

In example 37, the apparatus of example 36, wherein the one or more processors are to: determine whether the estimated interference level exceeds a reference interference level to establish that DL transmissions from the eNB will interfere in one or more subframes with UL transmissions from the UE to another eNB.

In example 38, the apparatus of example 37, wherein the reference interference level is one of: a predetermined interference level, or an interference level configured by higher layers.

In example 39, the apparatus of any of examples 37 through 38, wherein the one or more processors are to: modify the DL transmission to have a reduced transmission power based on the established interference condition.

In example 40, the apparatus of any of examples 35 through 39, wherein the one or more processors are to: generate a Clear to Send to self (CTS-to-self) transmission carrying an indicator of the transmission power reduction.

In example 41, the apparatus of example 40, wherein the indicator of transmission power reduction has one or more values indicating a respectively corresponding set of one or more predetermined power reduction values.

Example 42 provides an Evolved Node B (eNB) device comprising an application processor, a memory, one or more antenna ports, and an interface for allowing the application processor to communicate with another device, the eNB device including the apparatus of any of examples 35 through 41.

Example 43 provides a method comprising: establishing, for an Evolved Node B (eNB) operable to communicate with a User Equipment (UE) over an unlicensed spectrum on a wireless network, that Downlink (DL) transmissions from the eNB will interfere in one or more subframes with Uplink (UL) transmissions from the UE to another eNB; and modifying a DL transmission based upon the established interference condition.

In example 44, the method of example 43, comprising: calculating a receive power of a Clear to Send (CTS) transmission; and estimating an interference level of the CTS transmission.

In example 45, the method of example 44, comprising: determining whether the estimated interference level exceeds a reference interference level to establish that DL transmissions from the eNB will interfere in one or more subframes with UL transmissions from the UE to another eNB.

In example 46, the method of example 45, wherein the reference interference level is one of: a predetermined interference level, or an interference level configured by higher layers.

In example 47, the method of any of example 45 through 46, comprising: modifying the DL transmission to have a reduced transmission power based on the established interference condition.

In example 48, the method of any of examples 43 through 47, comprising: generating a Clear to Send to self (CTS-to-self) transmission carrying an indicator of the transmission power reduction.

In example 49, the method of example 48, wherein the indicator of transmission power reduction has one or more values indicating a respectively corresponding set of one or more predetermined power reduction values.

Example 50 provides machine readable storage media having machine executable instructions stored thereon that, when executed, cause one or more processors to perform a method according to any of examples 43 through 49.

Example 51 provides an apparatus of an Evolved Node B (eNB) operable to communicate with a User Equipment (UE) over an unlicensed spectrum on a wireless network, comprising: means for establishing that Downlink (DL) transmissions from the eNB will interfere in one or more subframes with Uplink (UL) transmissions from the UE to another eNB; and means for modifying a DL transmission based upon the established interference condition.

In example 52, the apparatus of example 51, comprising: means for calculating a receive power of a Clear to Send (CTS) transmission; and means for estimating an interference level of the CTS transmission.

In example 53, the apparatus of example 52, comprising: means for determining whether the estimated interference level exceeds a reference interference level to establish that DL transmissions from the eNB will interfere in one or more subframes with UL transmissions from the UE to another eNB.

In example 54, the apparatus of example 53, wherein the reference interference level is one of: a predetermined interference level, or an interference level configured by higher layers.

In example 55, the apparatus of any of example 53 through 54, comprising: means for modifying the DL transmission to have a reduced transmission power based on the established interference condition.

In example 56, the apparatus of any of examples 51 through 55, comprising: means for generating a Clear to Send to self (CTS-to-self) transmission carrying an indicator of the transmission power reduction.

In example 57, the apparatus of example 56, wherein the indicator of transmission power reduction has one or more values indicating a respectively corresponding set of one or more predetermined power reduction values.

Example 58 provides machine readable storage media having machine executable instructions that, when executed, cause one or more processors of an Evolved Node B (eNB) operable to communicate with a User Equipment (UE) on a wireless network to perform an operation comprising: establish that Downlink (DL) transmissions from the eNB will interfere in one or more subframes with Uplink (UL) transmissions from the UE to another eNB; and modify a DL transmission based upon the established interference condition.

In example 59, the machine readable storage media of example 58, the operation comprising: calculate a receive power of a Clear to Send (CTS) transmission; and estimate an interference level of the CTS transmission.

In example 60, the machine readable storage media of example 59, the operation comprising: determine whether the estimated interference level exceeds a reference interference level to establish that DL transmissions from the eNB will interfere in one or more subframes with UL transmissions from the UE to another eNB.

In example 61, the machine readable storage media of example 60, wherein the reference interference level is one of: a predetermined interference level, or an interference level configured by higher layers.

In example 62, the machine readable storage media of any of example 60 through 61, the operation comprising: modify the DL transmission to have a reduced transmission power based on the established interference condition.

In example 63, the machine readable storage media of any of examples 58 through 62, the operation comprising: generate a Clear to Send to self (CTS-to-self) transmission carrying an indicator of the transmission power reduction.

In example 64, the machine readable storage media of example 63, wherein the indicator of transmission power reduction has one or more values indicating a respectively corresponding set of one or more predetermined power reduction values.

In example 65, the apparatus of any of examples 1 through 8, and 35 through 41, wherein the one or more processors comprise a baseband processor.

In example 66, the apparatus of any of examples 1 through 8, and 35 through 41, comprising a memory for storing instructions, the memory being coupled to the one or more processors.

In example 67, the apparatus of any of examples 1 through 8, and 35 through 41, comprising a transceiver circuitry for at least one of: generating transmissions, encoding transmissions, processing transmissions, or decoding transmissions.

In example 68, the apparatus of any of examples 1 through 8, and 35 through 41, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a first base station and a second base station over an unlicensed spectrum on a wireless network, comprising:
   one or more processors to:
      establish that Downlink (DL) transmissions from the second base station will interfere with one or more subframes of Uplink (UL) transmissions from the UE to the first base station, resulting in an interference condition; and
      modulate a UL transmission power for the UL transmissions from the UE to the first base station based upon the interference condition, and
   an interface for receiving the DL transmissions from the second base station through a receiving circuitry and for sending the UL transmissions to the first base station through a transmission circuitry.

2. The UE of claim 1, wherein the one or more processors are to:
   measure a first DL transmission from the first base station to determine a first measurement;
   measure a second DL transmission from the second base station to determine a second measurement; and
   provide a report including the first measurement and the second measurement to the first base station to establish that DL transmissions from the second base station interfere with the one or more subframes of the UL transmissions from the UE to the first base station.

3. The UE of claim 1, wherein the one or more processors are to:
process a first DL configuration transmission from the first base station carrying indicators of two or more sets of power control parameters.

4. The UE of claim 3, wherein the first DL configuration transmission is one of: a Radio Resource Control (RRC) transmission, a Downlink Control Information (DCI) format 0A transmission, a DCI format 0B transmission, a DCI format 4A transmission, a DCI format 4B transmission, or a Physical Downlink Control Channel (PDCCH) transmission.

5. The UE of claim 3, wherein the one or more processors are to:
process a second DL configuration transmission from the first base station carrying an indicator of which set of power control parameters to use during the one or more UL subframes.

6. The UE of claim 3, wherein the one or more processors are to:
process a third DL configuration transmission from the first base station carrying an indicator of which UL subframes of the one or more UL subframes are for use of a set of power control parameters.

7. Machine readable non-transitory storage media having machine executable instructions that, when executed, cause one or more processors of a User Equipment (UE) operable to communicate a first base station and a second base station over an unlicensed spectrum on a wireless network to perform operations comprising:
establishing that Downlink (DL) transmissions from the second base station will interfere with one or more subframes of Uplink (UL) transmissions from the UE to the first base station, resulting in an interference condition; and
modulating a UL transmission power for the UL transmissions from the UE to the first base station based upon the interference condition.

8. The machine readable non-transitory storage media of claim 7, the operations further comprising:
measuring a first DL transmission from the first base station to determine a first measurement;
measuring a second DL transmission from the second base station to determine a second measurement; and
providing a report including the first measurement and the second measurement to the first base station to establish that DL transmissions from the second base station interfere with the one or more subframes of the UL transmissions from the UE to the first base station.

9. The machine readable non-transitory storage media of claim 7, the operations further comprising:
processing a first DL configuration transmission from the first base station carrying indicators of two or more sets of power control parameters.

10. The machine readable non-transitory storage media of claim 9, wherein the first DL configuration transmission is one of: a Radio Resource Control (RRC) transmission, a Downlink Control Information (DCI) format 0A transmission, a DCI format 0B transmission, a DCI format 4A transmission, a DCI format 4B transmission, or a Physical Downlink Control Channel (PDCCH) transmission.

11. The machine readable non-transitory storage media of claim 9, the operations further comprising:
processing a second DL configuration transmission from the first base station carrying an indicator of which set of power control parameters to use during the one or more UL subframes.

12. The machine readable non-transitory storage media of claim 9, the operations further comprising:
processing a third DL configuration transmission from the first base station carrying an indicator of which UL subframes of the one or more UL subframes are for use of a set of power control parameters.

13. An apparatus of a base station operable to communicate with a User Equipment (UE) over an unlicensed spectrum on a wireless network, comprising:
one or more processors to:
establish that Downlink (DL) transmissions from the base station to the UE will interfere with one or more subframes of Uplink (UL) transmissions from the UE to another base station, resulting in an interference condition; and
modify a DL transmission power for the DL transmissions from the base station to the UE based upon the interference condition, and
an interface for sending the DL transmissions from the base station to the UE through a transmitting circuitry.

14. The apparatus of claim 13, wherein the one or more processors are to:
calculate a receive power of a Clear to Send (CTS) transmission; and
estimate an interference level of the CTS transmission.

15. The apparatus of claim 14, wherein the one or more processors are to:
determine whether the estimated interference level exceeds a reference interference level to establish that the DL transmissions from the base station interfere with the one or more subframes of the UL transmissions from the UE to another base station.

16. The apparatus of claim 15, wherein the reference interference level is one of: a predetermined interference level or an interference level configured by higher layers.

17. The apparatus of claim 15, wherein the one or more processors are to:
modify the DL transmission power to have a reduced transmission power.

18. The apparatus of claim 13, wherein the one or more processors are to:
generate a Clear to Send to self (CTS-to-self) transmission carrying an indicator of transmission power reduction to modify the DL transmission power.

19. Machine readable non-transitory storage media having machine executable instructions that, when executed, cause one or more processors of a base station operable to communicate with a User Equipment (UE) on a wireless network to perform an operations comprising:
establishing that Downlink (DL) transmissions from the base station to the UE will interfere with one or more subframes of Uplink (UL) transmissions from the UE to another base station, resulting in an interference condition; and
modifying a DL transmission power for the DL transmissions from the base station to the UE based upon the interference condition.

20. The machine readable non-transitory storage media of claim 19, the operations further comprising:
calculating a receive power of a Clear to Send (CTS) transmission; and
estimating an interference level of the CTS transmission.

21. The machine readable non-transitory storage media of claim 20, the operations further comprising:
   determining whether the estimated interference level exceeds a reference interference level to establish that the DL transmissions from the base station interfere with the one or more subframes of the UL transmissions from the UE to another base station.

22. The machine readable non-transitory storage media of claim 21, wherein the reference interference level is one of: a predetermined interference level or an interference level configured by higher layers.

23. The machine readable non-transitory storage media of claim 21, the operations further comprising:
   modifying the DL transmission power to have a reduced transmission power.

24. The machine readable non-transitory storage media of claim 19, the operations further comprising:
   generating a Clear to Send to self (CTS-to-self) transmission carrying an indicator of transmission power reduction for modifying the DL transmission power.

* * * * *